Patented Jan. 1, 1952

2,580,737

UNITED STATES PATENT OFFICE 2,580,737

COBALT CHLORIDE HUMIDITY INDICATOR

Paul Bell Davis, Baltimore, Md., assignor to The Davison Chemical Corporation, Baltimore, Md., a corporation of Maryland No Drawing. Application January 19, 1949, Serial No. 71,758

5 Claims. (Cl. 252—408)

This invention relates to moisture indicators and has particular reference to compositions for indicating the relative humidity of a gaseous atmosphere.

This application is a continuation-in-part of my copending applications Serial Nos. 576,716, now U. S. Patent No. 2,460,065, and 576,722, now U. S. Patent No. 2,460,071, entitled Cobalt Sulphate Relative Humidity Indicators and Cobalt Chloride Relative Humidity Indicators respectively, and filed on February 7, 1945.

The co-pending applications mentioned above describe the manufacture of relative humidity indicators from silica gels which have been impregnated with cobalt sulphate and cobalt chloride. Indicators of this type change color when the atmosphere to which they are exposed passes through a certain range of relative humidity. The average silica gel has adsorptive properties such that the usual commercial indicator gel employing cobalt chloride has a color break when exposed to atmospheres having a relative humidity of about 30%. The color break at 30% relative humidity is very useful in indicating whether or not the atmosphere has a humidity low enough to prevent excessive rusting of iron and steel. In many instances, however, it is not necessary to maintain the humidity at such a low value, and for many purposes it is actually desirable to make sure that the atmosphere has a relative humidity well above 30%.

In those instances where the relative humidity may be above 30%, the use of an indicator changing color at a relative humidity of 30% will result in uneconomical use of the gel. Once the color change has taken place, no means are available for determining the condition of the atmosphere, and, for safety, the silica gel must be replaced with one which has been reactivated. Since the per cent of water adsorbed by silica gel increases rapidly with the relative humidity of the atmosphere to which it is exposed, it is clear that the most effective use of the silica gel can be obtained by allowing the atmosphere to reach the highest permissible relative humidity.

In those situations where the minimum permissible relative humidity is preferably well above 30%, it is essential that an indicator be employed which changes color at about the lowest permissible humidity range. An indicator gel having a color break at the proper range will then allow effective control of the conditions within the desired range, while those having a color break below the minimum permissible humidity range have little value.

It is an object of this invention to provide a composition for indicating the relative humidity of a gaseous atmosphere within predetermined limits.

Another object of this invention is to provide an economical method of manufacturing an indicator gel which will change color when exposed to an atmosphere having a relative humidity of 50–60%.

A further object of this invention is to provide a humidity indicator formed of cobalt chloride associated with an adsorbent carrier such as silica gel.

A further object of this invention is to provide a relative humidity indicator having a color change in response to the relative humidity of the atmosphere to which it is exposed allowing most efficient use of desiccating materials employed to control the relative humidity of that atmosphere.

With these and other objects in view, this invention resides in the formation of a moisture indicator by impregnating wide pore silica gels with cobalt chloride and drying the impregnated gel.

This invention provides a method of manufacturing an indicator gel having a color break in the range of 50–60% relative humidity at low cost by employing a wide pore silica gel having a bulk density of 0.40 to .45 as the adsorbent material associated with the cobalt chloride. A wide pore gel suitable for use in this invention has the following adsorption characteristics:

*Table I*

| Per Cent Relative Humidity | Per Cent Water Adsorption |
|---|---|
| 10 | 1 |
| 20 | 2 |
| 40 | 5 |
| 60 | 8 |
| 80 | 22 |
| 100 | 95 |

This is in contrast with the adsorption characteristics of the average commercial silica gels having a bulk density of 0.65 to 0.70 which are as follows:

*Table II*

| Per Cent Relative Humidity | Per Cent Water Adsorption |
|---|---|
| 10 | 7 |
| 20 | 11 |
| 40 | 22 |
| 60 | 34 |
| 80 | 38 |
| 100 | 40 |

The wide pore gel of this invention is most advantageously prepared by washing a homogeneous silica hydrogel, preferably having a silica content of about 17%, with a wash water having a pH of 9 at 175° F., the alkalinity of the water being continuously regulated by the addition of ammonia. The washing is continued for about forty-five hours after which the washed hydrogel is dried. The impregnation may be effected by spraying the dried gel with a solution of cobalt chloride in the ratio of 110-120 ml. per 100 grams of gel. The concentration of the solution is so adjusted as to yield the required quantity of cobalt chloride in the product. The final gel after drying at about 250° F. preferably has a cobalt chloride content of 2-5% on a dry basis.

The wide pore gel for use in this invention may also be prepared by treating an ordinary washed homogeneous silica hydrogel with a solution of 1% ammonia for eighteen hours or more and then drying in the usual way. The wide pore gel prepared in this manner may then be impregnated with silica gel in the manner described above.

The cobalt chloride content of the final gel may range from a minimum of about 2% to a maximum of 5%. The indicator containing only 2% of cobalt chloride has a detectable color change between 50 and 60% R. H., but since the contrast is weak, the color break might be difficult for an untrained eye to see. For this reason, it is preferable to increase the concentration of cobalt chloride in the humidity indicator to between 3-5%. Wide pore gels require a higher concentration of chromatic chemicals than standard gels, in order to obtain proper depth of color because of the almost total absence of internal reflections from the semiopaque granule.

It will be noticed that the indicator gel prepared according to this invention need not be heated to a high temperature for activation to control the range at which the color break occurs. The provision of an indicator having a color break at a high relative humidity allows most effective use of desiccating materials, such as silica gels, in the control of the humidity of a gaseous atmosphere.

Referring to Table II it will be noticed that an average commercial silica gel adsorbs about 17% water at a relative humidity of 30%. The same silica gel will adsorb 34% water when in equilibrium to an atmosphere of 60% relative humidity. If an indicator is used having a color break of about 30% relative humidity, it is apparent that it will be necessary to replace or regenerate the desiccant more often than is actually necessary since the desiccating material must be replaced when the color break occurs. If an indicator having a color break in the proper range is employed, the desiccant could be continued in use until the amount of water adsorbed by it is doubled.

The indicator of this invention allows important savings in the use of a desiccant in those instances, such as the prevention of mold, in which an atmosphere having a relative humidity up to about 60% is permissible. In certain situations, the relative humidity must be maintained above a minimum of, for example, about 50%. The cobalt chloride indicator gels hitherto commercially available, having a color break when exposed to an atmosphere having a relative humidity of 30%, have no value in these situations.

I claim:

1. A method of manufacturing a quantitative relative humidity indicator adapted to change color when the relative humidity of the atmosphere to which it is exposed is changed from below about 50-60% through that range comprising forming a silica hydrogel, treating the hydrogel with an ammoniacal solution to form a wide pore silica gel, impregnating the wide pore silica gel with a solution of cobalt chloride so that the impregnated gel has a cobalt chloride content of about 2-5% on a dry basis, and drying the impregnated gel.

2. A relative humidity indicator adapted to change color when exposed to an atmosphere of 50-60% relative humidity comprising a wide pore silica gel having a cobalt chloride content, on a dry basis, of about 2-5%.

3. A method of preparing a humidity indicator adapted to change color when exposed to an atmosphere having a relative humidity of 50-60%, comprising forming a homogeneous silica hydrogel, washing the hydrogel with water at a temperature of 175° F. and a pH of 9 for about 45 hours, drying the washed hydrogel, impregnating the resulting wide pore gel with cobalt chloride by treating it with a solution of such concentration as to yield 2-5% cobalt chloride on a dry basis in the product, and drying the impregnated gel.

4. A method of preparing a relative humidity indicator adapted to change color when the atmosphere to which it is exposed changes from below a relative humidity of about 50% to a range of 50-60% R. H., comprising forming a homogeneous silica hydrogel, washing the hydrogel in the usual manner, treating the washed hydrogel with an about 1% solution of ammonia for a period of about 18 hours, drying the hydrogel, impregnating the resulting wide pore gel with a solution of cobalt chloride of such concentration as to yield 2-5% cobalt chloride on a dry basis in the product, and drying the impregnated gel.

5. A method of manufacturing a quantitative relative humidity indicator adapted to change color when the relative humidity of the atmosphere to which it is exposed is changed from below about 50-60% through that range comprising forming a wide pore silica gel, impregnating the unactivated wide pore silica gel with a solution of cobalt chloride so that the impregnated gel has a cobalt chloride content of about 2-5% on a dry basis, and drying the impregnated gel.

PAUL BELL DAVIS.

REFERENCES CITED

The following references are of record in the file of this patent:

UNITED STATES PATENTS

| Number | Name | Date |
| --- | --- | --- |
| 2,460,071 | Davis | Jan. 25, 1949 |
| 2,477,695 | Kimberlin | Aug. 2, 1949 |